United States Patent [19]
Bennett

[11] 4,011,439
[45] Mar. 8, 1977

[54] MODULAR APPARATUS FOR ACCELERATED GENERATION OF A QUOTIENT OF TWO BINARY NUMBERS

[75] Inventor: Walter Scott Bennett, Loveland, Colo.

[73] Assignee: Burroughs Corporation, Detroit, Mich.

[22] Filed: Dec. 15, 1975

[21] Appl. No.: 639,514

Related U.S. Application Data

[63] Continuation of Ser. No. 489,885, July 19, 1974, abandoned.

[52] U.S. Cl. ............................................... 235/164
[51] Int. Cl.[2] ........................................... G06F 7/52
[58] Field of Search ................................... 235/164

[56] References Cited
UNITED STATES PATENTS

| | | | |
|---|---|---|---|
| 3,591,787 | 7/1971 | Friman | 235/164 |
| 3,633,018 | 1/1972 | Ling | 235/164 |
| 3,648,038 | 3/1972 | Sierra | 235/164 |
| 3,777,132 | 12/1973 | Bennett | 235/164 |

OTHER PUBLICATIONS

M. J. Flynn, "On Division by Functional Iteration" *IEEE Trans. on Computers* vol. C-19 No. 8 Aug. 1970 pp. 702-706.

*Primary Examiner*—David H. Malzahn
*Attorney, Agent, or Firm*—Nathan Cass; Kevin R. Peterson; Edward J. Feeney, Jr.

[57] ABSTRACT

A plurality of modular arrays, each structured from a common module, are connected together so as to form a binary quotient by successive approximations. For divisors that fall into that group of numbers that have reciprocals with a reasonably short period, the forming of a quotient with such a divisor and any dividend can be greatly accelerated after the add and shift sequence for the first period of the divisor reciprocal is obtained. A unity array, divisor array, dividend array, and quotient array may all be of equal length, but must be longer than the length of the periods of the reciprocals of the divisors utilized. The reciprocal of the divisor is effectively formed in the divisor array by generating a shift and add sequence that will produce a product that is a series of binary ones. After the first period of the divisor reciprocal is formed, the binary bits of the reciprocal start to repeat for the second period, and so on. By using the formed shift and add sequence that effectively represents the reciprocal of the divisor for a single period, to manipulate the dividend, the dividend is effectively multiplied by the reciprocal of the divisor, producing a product, most significant bit first, that is the quotient of the dividend and divisor. After obtaining the shift and add sequence representative of the first period of the divisor reciprocal, the quotient has been formed, most significant bit first, to a precision equal to the number of bits in the first period of the divisor reciprocal. The precision of the quotient can now be doubled by adding the formed quotient with itself after the quotient addend is shifted to the right the number of bit positions to which the quotient is precise. At the next step, the quotient precision can be quadrupled, and so on.

5 Claims, 16 Drawing Figures

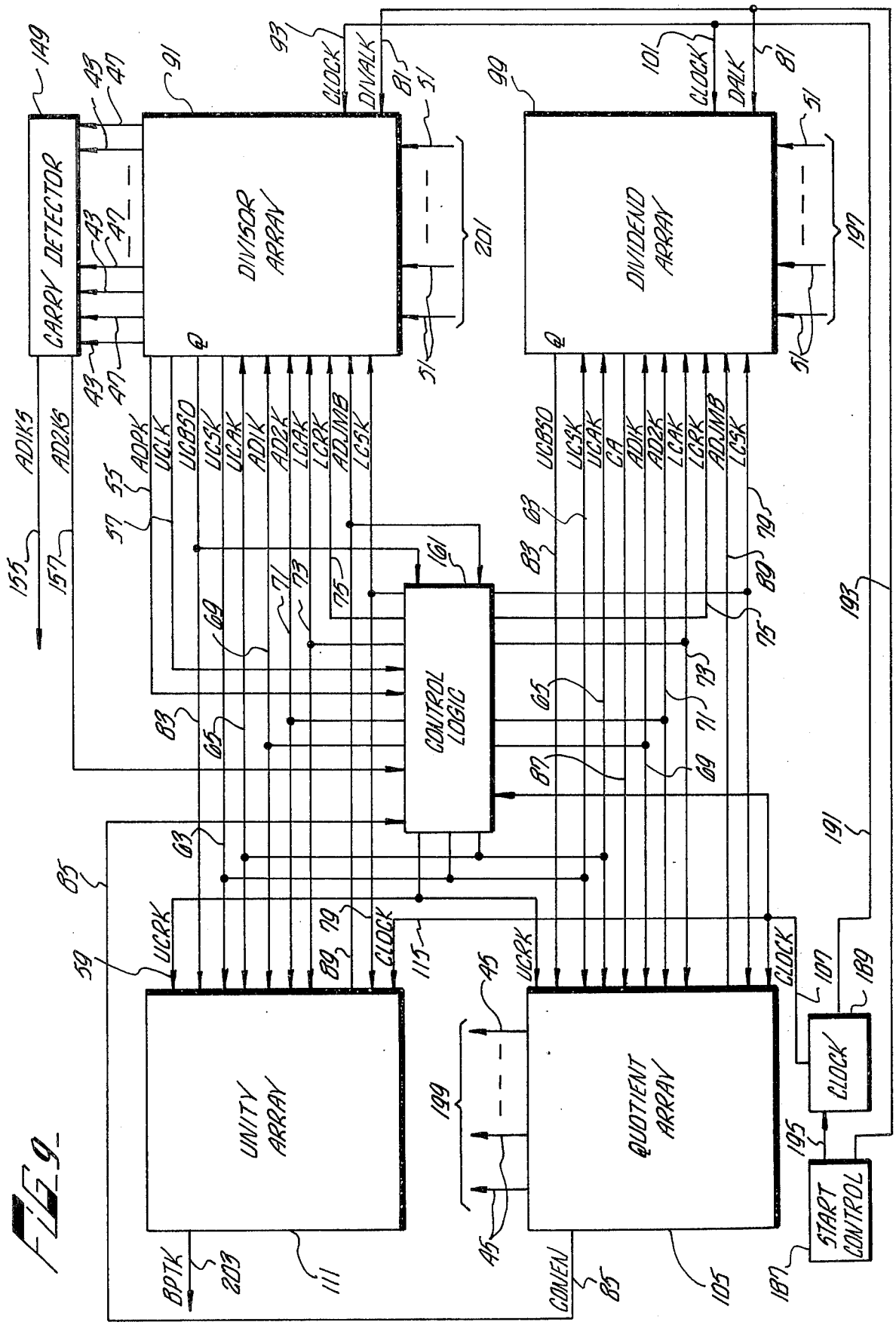

MODULAR APPARATUS FOR ACCELERATED GENERATION OF A QUOTIENT OF TWO BINARY NUMBERS

This is a continuation of application Ser. No. 489,855, filed July 19, 1974, now abandoned.

CROSS REFERENCE TO RELATED APPLICATIONS

This application is related to application Ser. No. 489,884 filed July 19, 1974, now abandoned in favor of continuation application Ser. No 639,517, filed Dec. 15, 1975 for Modular Apparatus for Binary Quotient, Binary Product, Binary Sum and Binary Difference Generation and to application Ser. No. 489,884 filed July 19, 1974, now abandoned in favor of continuation application Ser. No. 639,516, filed Dec. 15, 1975 for Enhanced Apparatus for Binary Quotient, Binary Product, Binary Sum and Binary Difference Generation.

BACKGROUND OF THE INVENTION

The present invention relates generally to improvements in binary arithmetic mechanisms and more particularly pertains to new and improved division apparatus wherein the quotient of two binary numbers is formed by determining the reciprocal of the divisor and multiplying it by the dividend.

Those concerned with the development of binary arithmetic mechanisms have recognized the need for mechanisms that have redundant structure and are able to perform division as inexpensively and as fast as multiplication. Among the arithmetic operations which are most often implemented in digital computer hardware, division stands out as the most complex to control and costly to execute. For example, refer to: *Digital Systems: Hardware Organization and Design*, by F. J. Hill and G. R. Peterson, published by John Wylie and Sons, 1973, and *Design of a Computer — The Control Data 6600*, by J. E. Thornton, published by Scott-Foresman and Company, Glenview, Illinois, 1970. These text books describe division as taking three to four times as long as multiplication.

With few exceptions, previously employed binary arithmetic algorithms have had strong decimal origins. Although conventional decimal approaches to addition, subtraction and multiplication are well adapted to binary machine implementation, the same cannot be said for "pencil and paper" decimal division nor for Newton-Raphson iterative methods of division. Nevertheless, almost all previously implemented binary division procedures derive from decimal procedures which fall into one or the other of these two categories.

Binary division procedures which do not have strong decimal origins have been reported, for example, by Huei Ling in U.S. Pat. No. 3,633,018, Hugh N. Sierra in U.S. Pat. No. 3,648,038, Goldschmidt and Powers in U.S. Pat. No. 3,508,038 and by W. Scott Bennett in U.S. Pat. No. 3,777,132. The division procedures described in the above patents have one or more relative disadvantages. For example, the method of Goldschmidt and Powers requires a table reference to initiate it and several multiplications to complete it. All the division apparatus described in the above recited publications utilize rather complex non-modular hardware that is largely unique to the division process.

SUMMARY OF THE INVENTION

An object of this invention is to provide a modular divider mechanism for accelerated generation of a quotient of two binary numbers.

This object and the general purpose of this invention is attained by utilizing a module as the basic building block for the divider mechanism. The modules are connected into four arrays. A first array is used as a unity array, a second array is used as a divisor array, a third array is used as a dividend array, and a fourth array is used as a quotient array. The divisor array is utilized to effectively form the reciprocal of the binary divisor, most significant bit first, by successive approximations. The unknown reciprocal as represented by the evolving shift and add steps is evolved by picking shift and add steps, one at a time, starting with the step for the most significant bit, so that the evolving product is a series of binary numbers. Control circuitry dictates this formation of shift and add steps for the divisor by controlling the positioning of the divisor before each addition step with itself. The add and shift sequence obtained in consequence, effectively reflects the reciprocal of the divisor. As each add or shift step is obtained, it is utilized to manipulate the dividend accordingly, thereby generating the quotient, most significant bit first. The manipulation of the dividend according to the shift and add sequence obtained is effectively the same as multiplying the dividend by the reciprocal of the divisor, most significant bit first. For divisors that fall into that group of numbers that have reciprocals with a reasonably short period, the forming of a quotient with such a divisor and any dividend is greatly accelerated after the add and shift sequence for the first period of the divisor reciprocal is obtained. The unity array, divisor array, dividend array, and quotient array may all be of equal length and must be longer than the length of the periods of the reciprocals of the divisors utilized for this to occur. After the first period of a divisor reciprocal is effectively formed, the bits of the reciprocal start to repeat for the second period, and so on. After the end of the first period of the divisor reciprocal, the quotient has been formed, most significant bit first, to an accuracy equal to the number of bits in the first period of the divisor reciprocal. The accuracy of the quotient can now be doubled by adding the formed quotient with itself, after the addend quotient is shifted to the right with respect to the augend quotient the number of bit positions to which the quotient is accurate. At the next step, the quotient accuracy can be quadrupled, and so on.

BRIEF DESCRIPTION OF THE DRAWINGS

Other objects and many of the attendant advantages of this invention will be readily appreciated as the same becomes better understood by reference to the following detailed description when considered in conjunction with the accompanying drawings in which like reference numerals designate like parts throughout the figures thereof, and wherein:

FIG. 9 illustrates in block diagram form the interconnection of the divisor, dividend, quotient and unity arrays along with the carry detector and control logic for performing division according to the present invention;

Figure 10A:
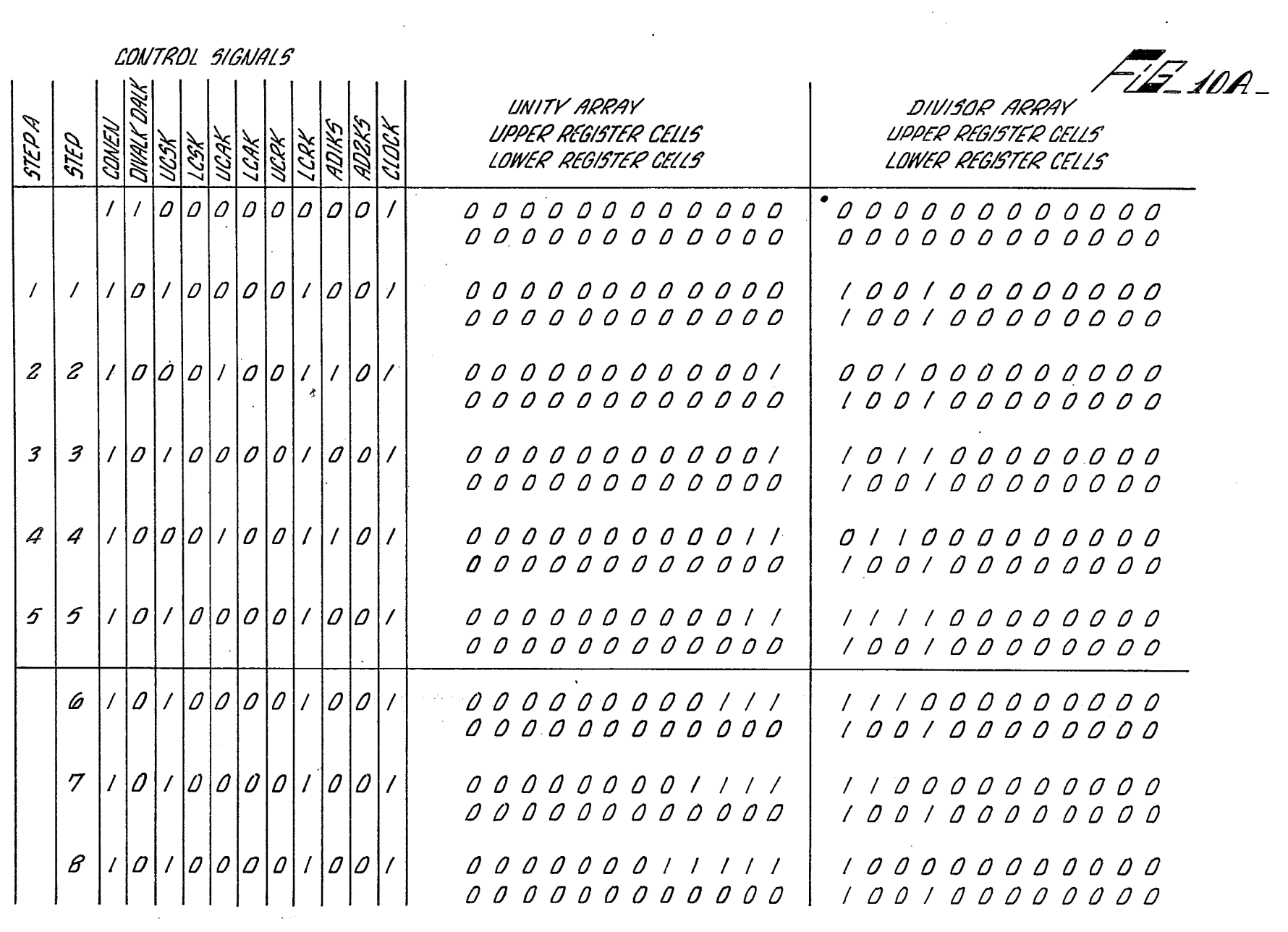
Figure 10B:
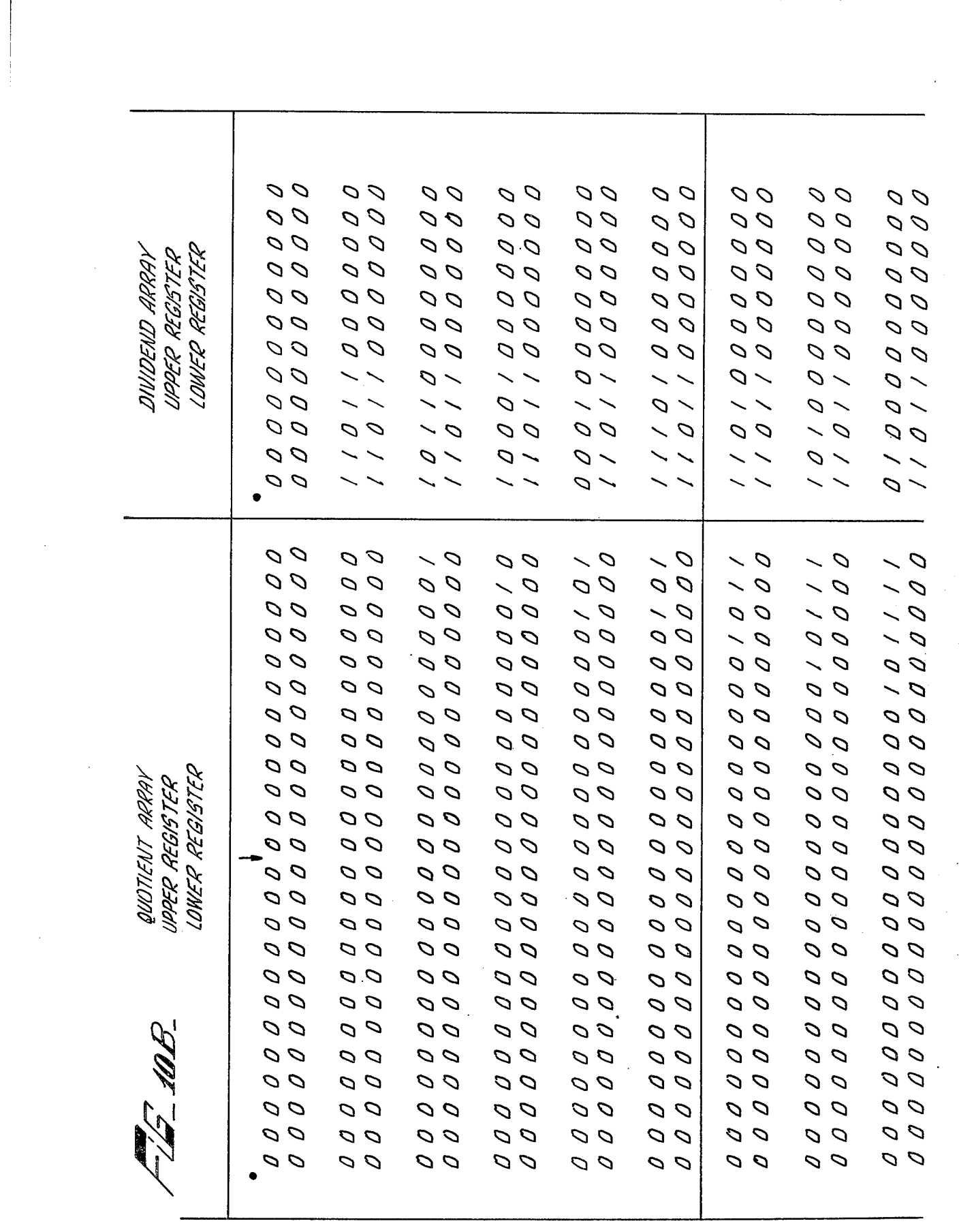
Figure 10C:
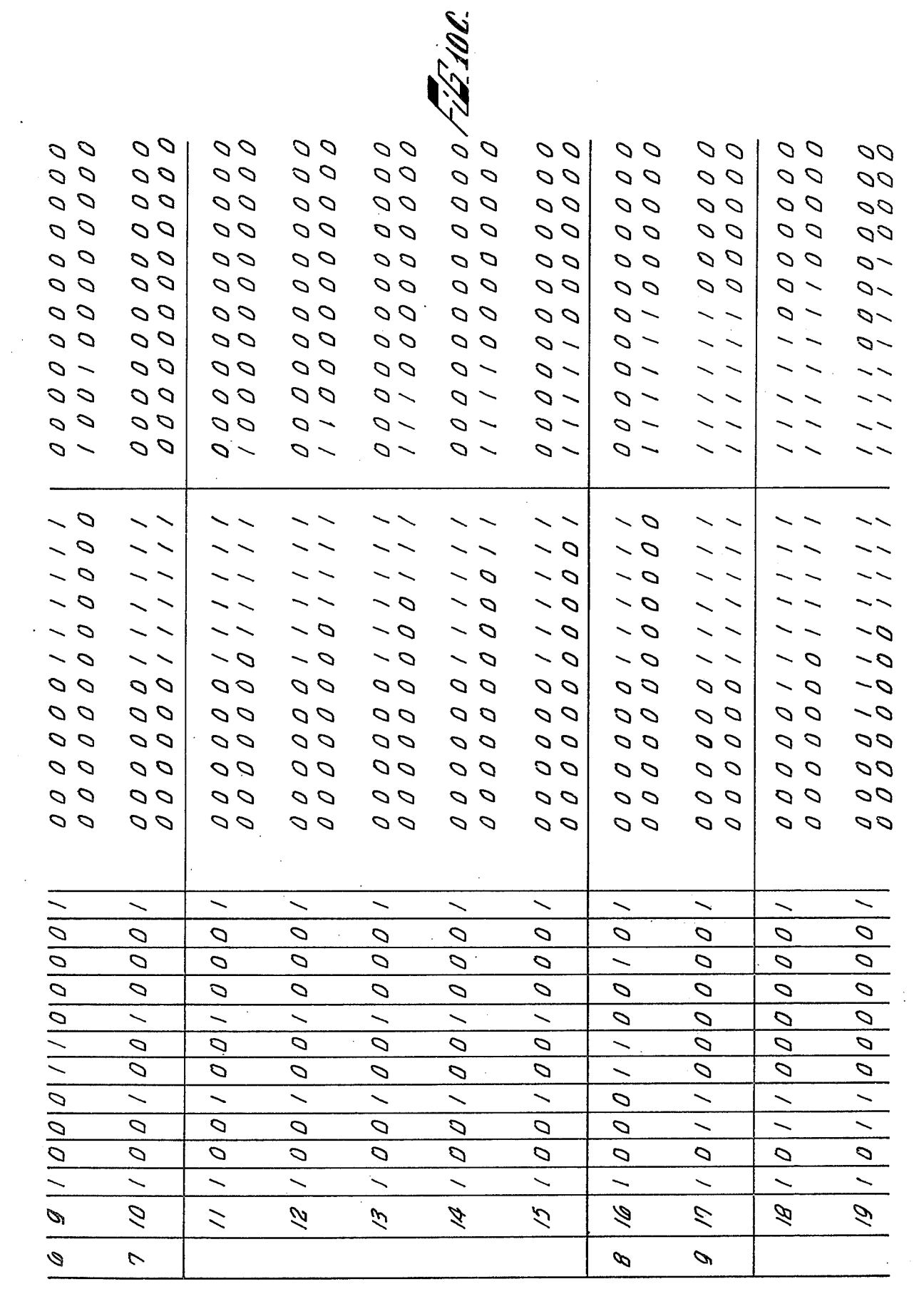
Figure 10D:
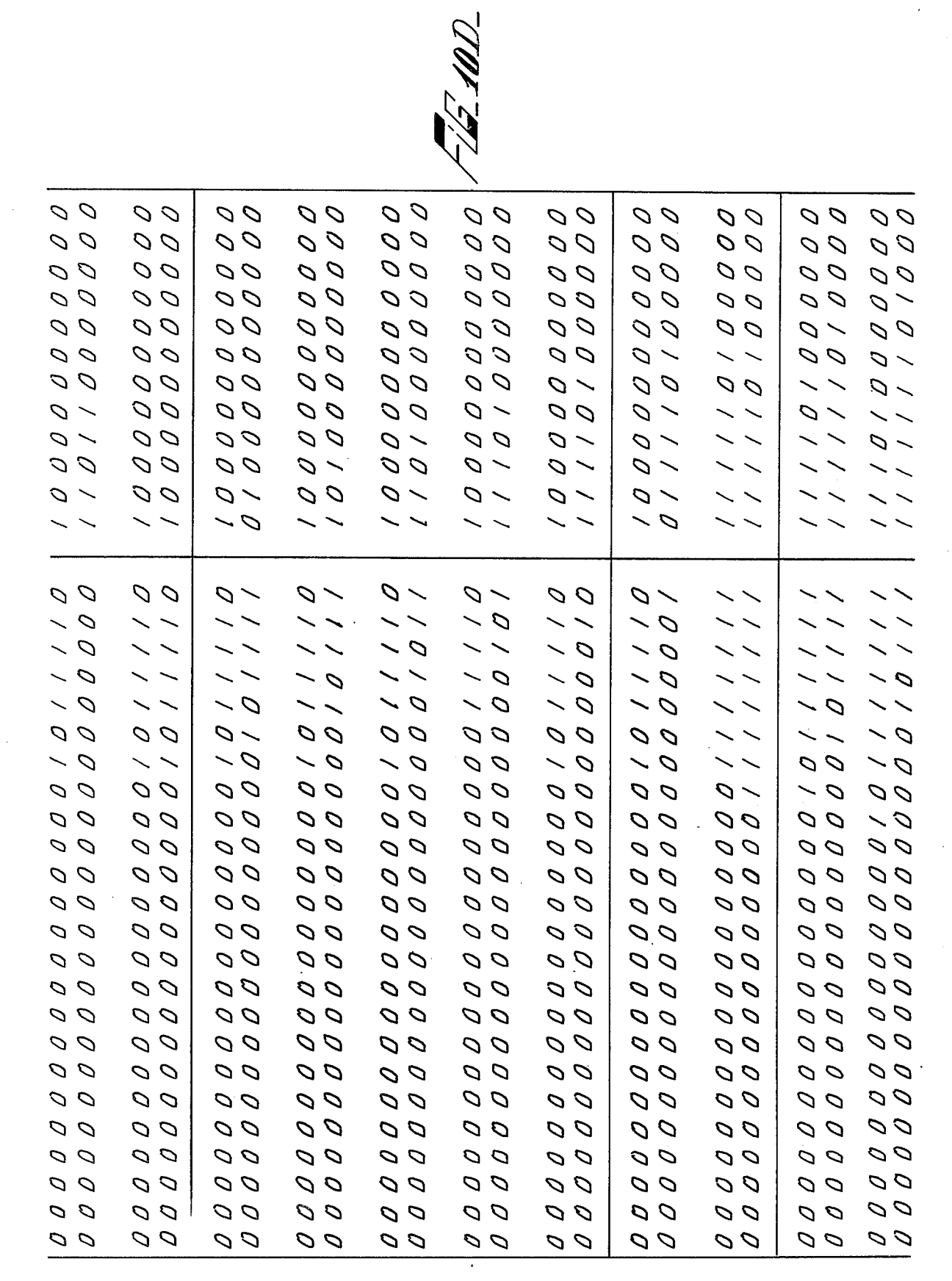
Figure 10E:
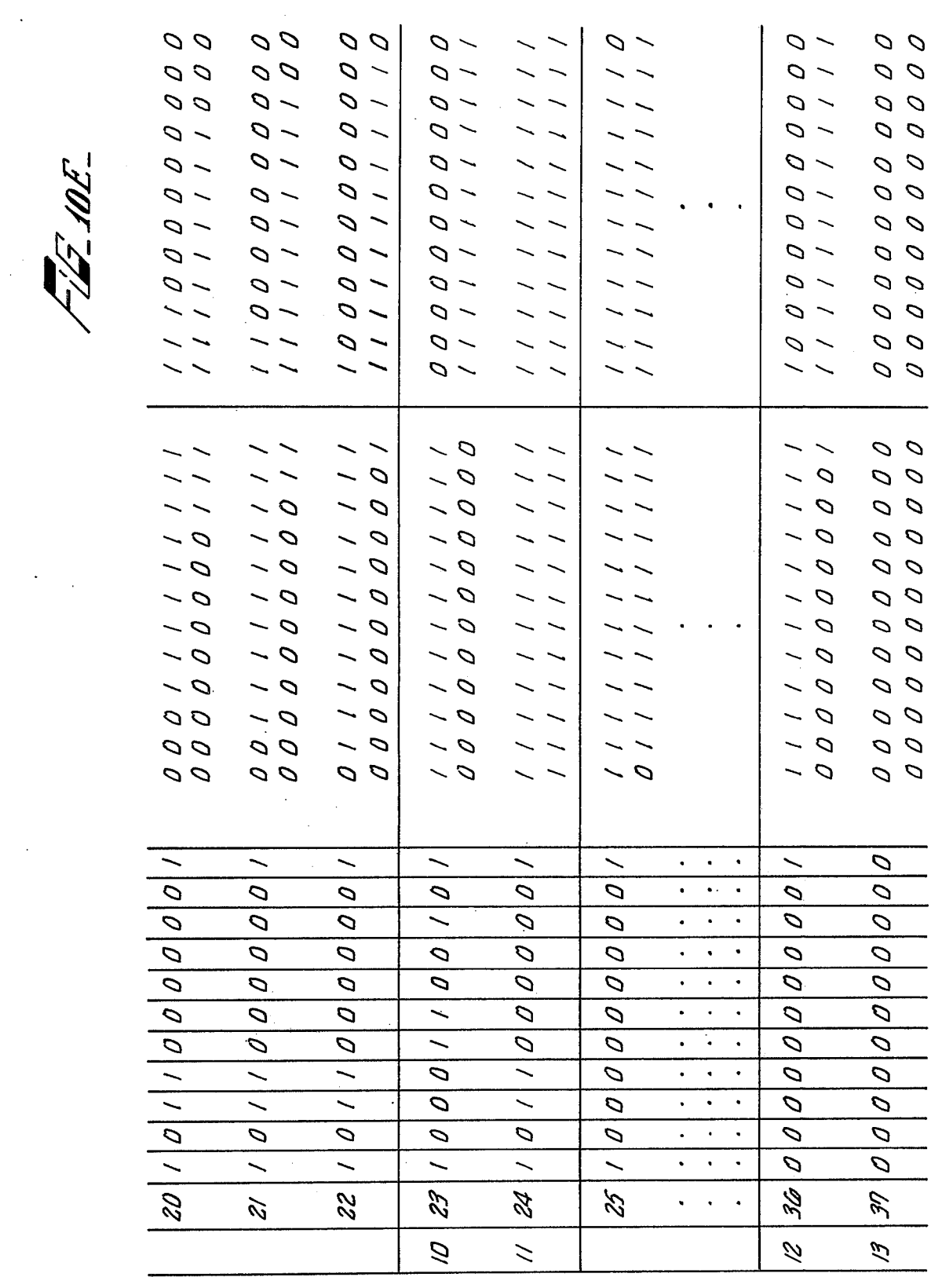
Figure 10F:
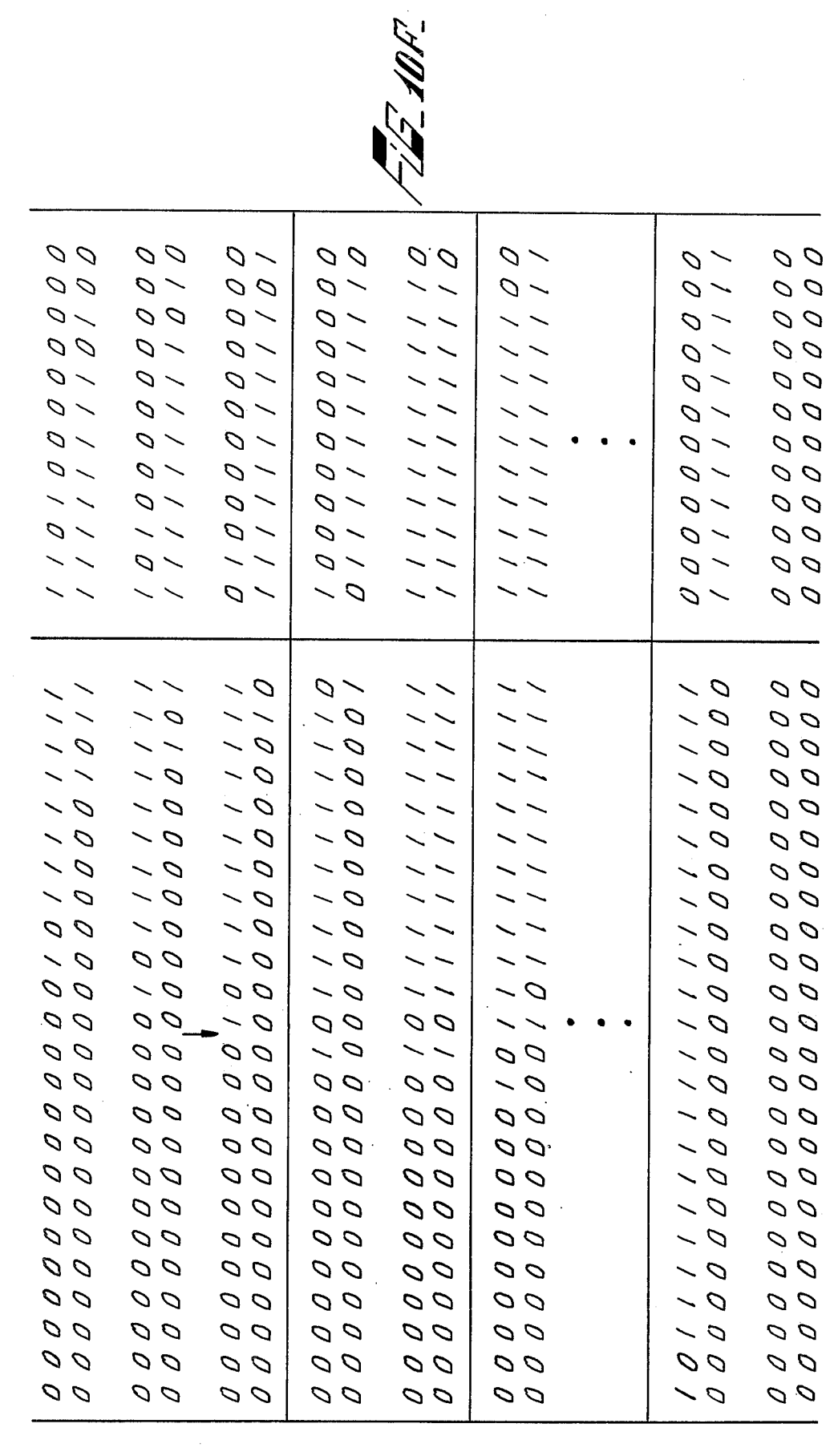

FIGS. 10A through 10F are illustrations of the states of the apparatus of FIG. 9 during solution of a specific division problem;

FIG. 11 is a diagram showing the relationships of FIGS. 10A through 10F.

DESCRIPTION OF THE PREFERRED EMBODIMENTS

Figure 1:
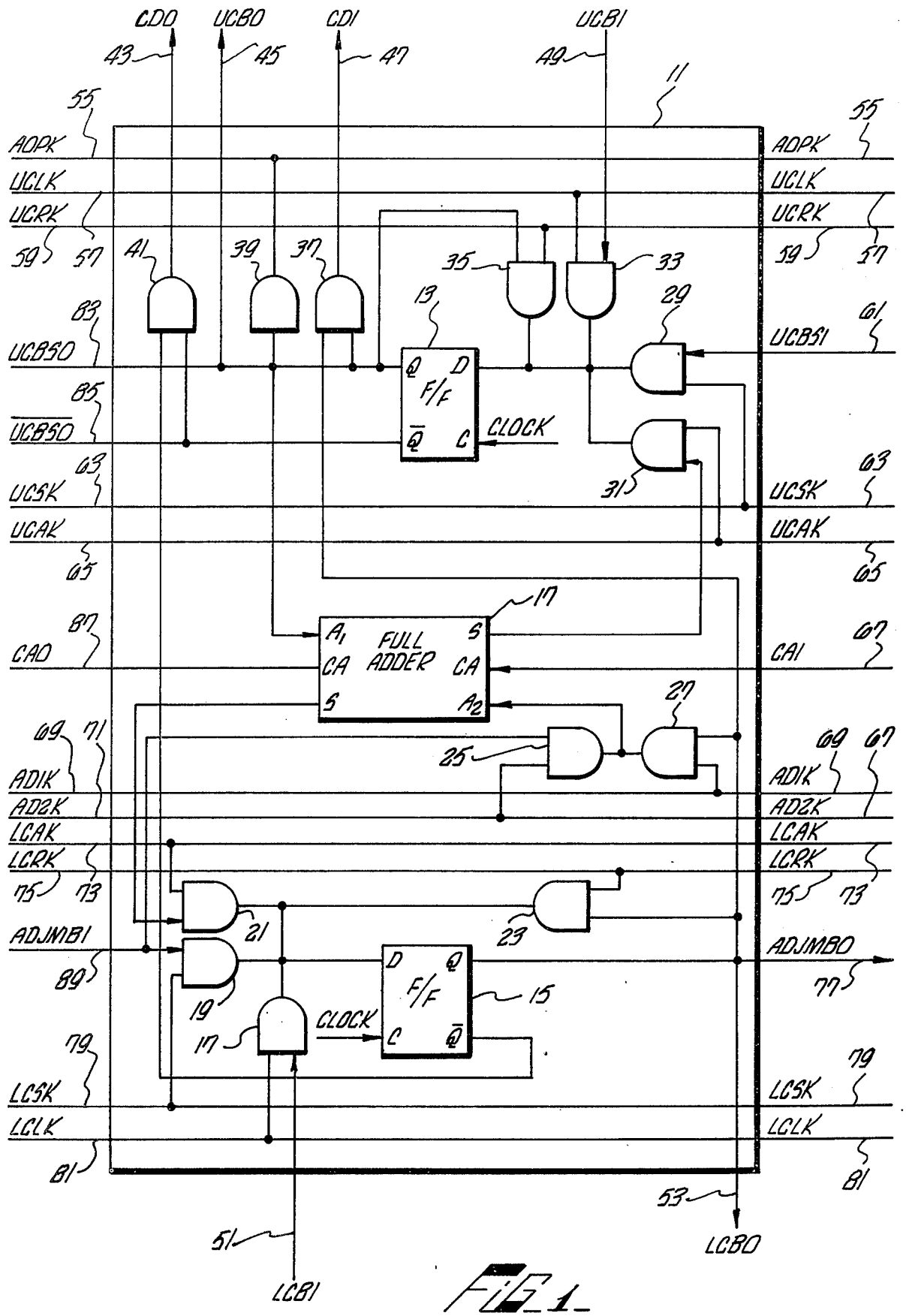
FIG. 1 is a logic circuit diagram for a single module that is utilized redundantly in the present invention.

It would, perhaps, be helpful to the understanding of the specific embodiments of the invention if the reader was familiar with the theoretical bases of the invention. The present invention represents a further development of inventions disclosed in applications Ser. Nos. 489,884 and 489,886, both filed on July 19, 1974, now abandoned in favor of Ser. No. 639,517, filed Dec. 15, 1975, and Ser. No. 639,516, filed Dec. 15, 1975, respectively. The theoretical discussion in the latter application is equally applicable as the theoretical basis for this invention and should be referred to by the reader.

The present invention improves the inventions described in the above two co-pending applications by providing for the doubling, quadrupling, etc., of the bit precision of the quotient after the quotient has been generated to a precision that is equal to the length in bits of the first period in the reciprocal of the divisor. That is, after the first period of the quotient is obtained, a simple two-step add and shift sequence can double the bit precision of the quotient, the next two-step add and shift sequence can double that again, thereby quadrupling the bit precision of the quotient, and so on. This accelerated division technique is only practical for those divisors that have reciprocals whose periods are of reasonably short length. This is so because, in order for this invention to function at its peak effectiveness, the length of the quotient register must be greater, preferably by a magnitude or more, than the bit length in a period of the reciprocal of the divisor being utilized. The present invention has no effect in a situation where the bit length of a period in the reciprocal of the divisor being utilized is greater than, or only slightly less than, the length of the quotient register being used.

Thus, for a certain length quotient register, only a certain group of divisors may be processed more rapidly by dividing apparatus functioning according to this invention. The dividing mechanism of the present invention operates on divisors and dividends when received in floating binary point format. In other words, the divisors and dividends received by the apparatus range between 1/2 and 1, the actual binary points being dictated by the exponent values obtained when adjusting the divisors and dividends to this floating binary point form. Assuming then, for example, that a dividing mechanism has a quotient register that is only slightly longer than 10 bits, it would then be desirable to find all rational binary fractions, that is, divisor mantissas, that have reciprocals having a period that is 10 bits long, or less.

Taking first the general case to find all rational binary fractions, $d = n/2^q$ (where both n and q are positive integers) having reciprocals of period p, it is sufficient to find all positive integers which divide $2^p-1$. For, if $$n \times r = 2^p-1,$$

then:

$$d \times \frac{r}{2^{p-q}} = \frac{n}{2^q} \times \frac{r}{2^{p-q}} = \frac{(2^p-1)}{2^p}$$

$$= (1 + 2^{-p} + 2^{-2p} + \ldots)^{-1}$$

$$= \left( \sum_{i=0}^{i=\infty} 2^{-ip} \right)^{-1}.$$

Therefore:

$$\frac{1}{d} = \frac{r}{2^{p-q}} (1 + 2^{-p} + 2^{-2p} + 2^{-3p} + \ldots)$$

$$= \frac{r}{2^{p-q}} \sum_{i=0}^{i=\infty} 2^{-ip}$$

Thus, given p (the length of the quotient register) and all divisors of $2^p-1$, it is a simple matter to find all fractions, d having reciprocals with a minimum period p, as well as all those with periods less than p.

Assuming that $p = 10$, $2^p-1 = 2^{10}-1$, which equals 1023. The prime factors of 1023 are 3, 11 and 31. Therefore, all positive integer divisors of 1023 are 1, 3, 11, 31, 33 93, 341 and 1023. There are no other divisors of 1023. Therefore, the desired values of d are:

| d | $d = n/2^q$ | $1/d = r/2^{p-q}$ |
|---|---|---|
| 0.1011 | $11/16 = 11/2^4$ | $93/2^6$ |
| 0.100001 | $33/64 = 33/2^6$ | $31/2^4$ |
| 0.1011101 | $93/128 = 93/2^7$ | $11/2^3$ |
| 0.101010101 | $341/512 = 341/2^9$ | $3/2^1$ |
| 0.1111111111 | $1023/1024 = 1023/2^{10}$ | $1/2^0$ |

These are the divisors that may be used with effectiveness in the dividing mechanism according to this invention if the quotient register is only slightly longer than 10 bits.

To illustrate generally how the present invention functions to double and quadruple the precision of the quotient, take, for example, the division problem wherein 27 is divided by 9 yielding an answer of 3. In binary form, the dividend would be 11011, the divisor 1001 and the answer 11. To obtain the first period of the reciprocal of the divisor 1011, let us divide the divisor into 1 by long-hand:

```
           .0001110001....
    1001  1.0000000000
           1001
           ‾‾‾‾
            1110
            1001
            ‾‾‾‾
             1010
             1001
             ‾‾‾‾
             10000
              1001
```

As can be seen from this example, after the first six most significant bits of the reciprocal of 1001, the remainders start to repeat. Therefore, the period of the reciprocal of the divisor 1001 is six bits in length. To obtain a quotient that is accurate to the first six most significant bits, we may multiply the dividend by the first period of the reciprocal of the divisor:

```
         11011
        .000111
        ‾‾‾‾‾‾‾
         11011
         11011
         11011
        ‾‾‾‾‾‾
       10.111101
```

As can be seen from the long-hand multiplication example, the answer is a correct approximation of three (10.1111 . . . 1) to within less than 0.0001 (binary), or to six significant bits, the same number of bits as in a period of the reciprocal of the divisor. In order to double the precision of the quotient, once having obtained it to a precision that equals the length of a period of the reciprocal of the divisor, a simple two-step shift and add sequence is used. An example of such a sequence follows:

```
        10111101
    +       10111101
        ‾‾‾‾‾‾‾‾‾‾‾‾
        10111111111101
    +           10111111111101
        ‾‾‾‾‾‾‾‾‾‾‾‾‾‾‾‾‾‾‾‾‾‾
        10111111111111111111111101
```

As can be seen from the above example, after the second two-step shift and add sequence the quotient is an approximation of the answer three to a precision of 24 bits. Thus, in four steps, the precision of the quotient has been quadrupled. After six such sequences, the original precision would be increased eight fold, etc.

Referring now to FIG. 1, a module 11 that is used as the basic building block for the divider mechanism of the present invention is shown as comprising a full adder 17, an upper storage element 13 and a lower storage element 15. The upper and lower storage elements 13 and 15 are D-type flip-flops.

The upper flip-flop 13 can be loaded from four separate sources. When Upper Cell Restore Control (UCRK) line 59 is high, the upper cell flip-flop 13 receives at its D input the signal present at its Q output through AND Gate 35. When Upper Cell Load Control (UCLK) line 57 is high, the upper flip-flop 13 receives as its D input over Upper Cell Bit In (UCBI) line 49, through AND Gate 33 a binary information bit from the outside. When Upper Cell Shift Control (UCSK) line 63 is high, upper flip-flop 13 receives at its D input from Upper Cell Bit Shift In (UCBSI) line 61 through AND Gate 29 a bit from the Q output of the upper flip-flop in an adjacent less significant module. When Upper Cell Add Control (UCAK) line 65 is high, the D input of upper flip-flop 13 is supplied binary information from the Sum (S) output of full adder 17 through AND Gate 31.

The Q output of the upper flip-flop 13, besides being supplied back to its input through AND Gate 35, is utilized in five other locations. The Q output of the upper flip-flop 13 is anded together with the Q output of the lower flip-flop 15 by AND Gate 37 to generate a carry detect signal on Carry Detect One (CD1) line 47. The Q output is supplied through an isolation gate 39 to Accelerated Operation Control (AOPK) line 55. The Q output is supplied to the outside over Upper Cell Bit Out (UCBO) line 45. The Q output of flip-flop 13 is supplied to the next most significant module over Upper Cell Bit Shift Out (UCBSO) line 83. The Q output is also supplied to a First Add ($A_1$) input of the full adder 17.

The $\overline{Q}$ output of upper flip-flop 13 is made available over the $\overline{UCBSO}$ line 85. The $\overline{Q}$ output of upper cell flip-flop 13 is anded with the $\overline{Q}$ output of the lower flip-flop 15 by AND Gate 41 to produce a carry detect signal on Carry Detect Zero (CD0) line 43.

The lower flip-flop 15 of the module 11 is loaded from four different sources. When the Lower Cell Load Control (LCLK) line 81 is high, the flip-flop 15 is loaded with a bit from the outside over Lower Cell Bit In (LCBI) line 51 through AND Gate 17. When the Lower Cell Shift Control (LCSK) line 79 is high, the lower flip-flop 15 is loaded from the Q output of the lower cell flip-flop in the next most significant module over Adjacent Module Bit In (ADJMBI) line 89, through AND Gate 19. When Lower Cell Restore Control (LCRK) line 75 is high, the Q output of the lower flip-flop 15 is supplied back to its input through AND Gate 23. When Lower Cell Add Control (LCAK) line 73 is high, the Sum (S) output of full adder 17 is supplied to the input of lower flip-flop 15 through AND Gate 21.

The Q output of flip-flop 15, besides being supplied to AND Gate 37, is supplied over Adjacent Module Bit Out (ADJMBO) line 77 to the input of the lower flip-flop in the adjacent less significant module. The Q output of lower flip-flop 15 is also supplied to the outside over Lower Cell Bit Out (LCBO) line 53. The $\overline{Q}$ output of lower flip-flop 15 is supplied to AND Gate 41.

The full adder 17 receives the Q output of upper flip-flop 13 at its First Add ($A_1$) input and the Q output of the lower flip-flop 15 at its Second Add ($A_2$) input. The adder 17 supplies the sum of a particular addition to both the upper flip-flop 13 and the lower flip-flop 15. It receives a carry input over Carry Input (CAI) line 67 and generates a carry output signal over Carry Output (CAO) line 87. When Add One Control (AD1K) line 69 is high, the Q output of lower flip-flop 15 is supplied to the $A_2$ input of the full adder 17 through AND Gate 27. When Add Two Control (AD2K) line 71 is high, the output of the lower flip-flop of the next most significant module is supplied over Adjacent Module Bit In (ADJMBI) line 89 through AND Gate 25 to the $A_2$ input of the full adder 17.

Figure 2:
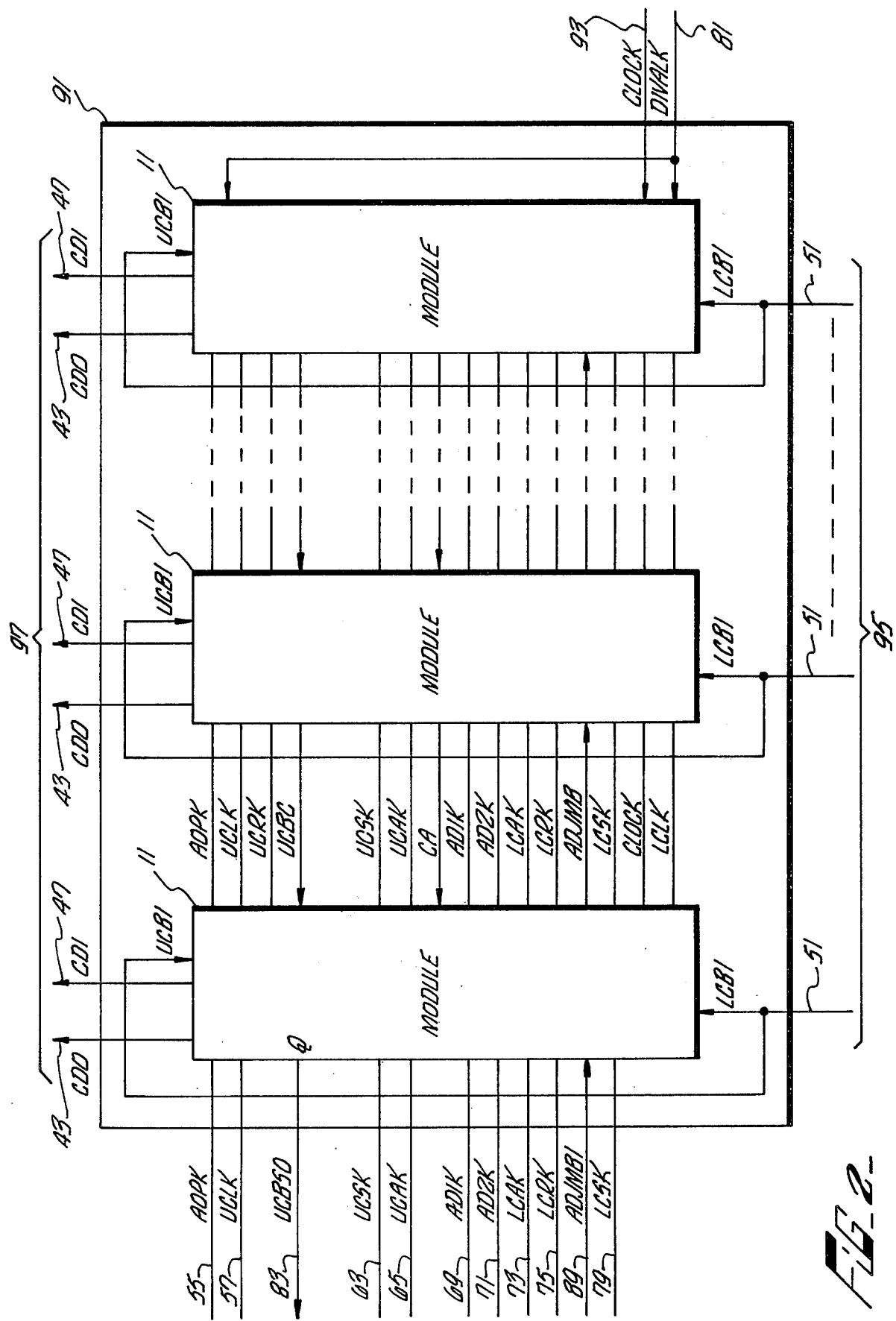
FIG. 2 illustrates in block diagram form the interconnection of a plurality of modules to form a divisor array.

Referring now to FIG. 2, the divisor array 91 is shown as comprising a plurality of like modules 11 connected in series, the number of modules being equal to or greater than the number of bits in the divisors being processed.

The divisor is loaded into the divisor array 91 over input lines 95. The array 91 receives clock signals over clock line 93 and divisor array load control signals over Divisor Array Load Control (DIVALK) line 81. The divisor array load control line 81 supplies the load control signal to both the UCLK and LCLK lines. As a consequence, the divisor is loaded simultaneously into the upper and lower cell registers of the divisor array. Each module in the divisor array supplies a carry detect zero and carry detect one signal for use by the carry detector circuit, which will be described hereinafter. These carry detect lines 97 are connected to the carry detect circuit in a manner to be also described hereinafter.

The divisor array 91 supplies an accelerated operation control signal on Accelerated Operation Control (AOPK) line 55 to a central control circuit to be described hereinafter. An upper cell load control signal on UCLK line 57 is supplied to the central control. The Q output of the upper flip-flop in the most significant module of the array is supplied over UCBSO line 83 to the control circuits and the unity array. The divisor array receives a plurality of control signals. It receives an upper cell shift control signal over line 63, an upper cell add control signal over line 65, an add one control signal over line 69, an add two control signal over line 71, a lower cell add control signal overline 73, a lower cell restore control signal over line 75, and a lower cell shift control signal over line 79. In addition to these control signals, the divisor array receives data over Adjacent Module Bit In line 89 from the output of the lower flip-flop in the least significant module of the unity array, which will be described hereinafter.

Figure 3:
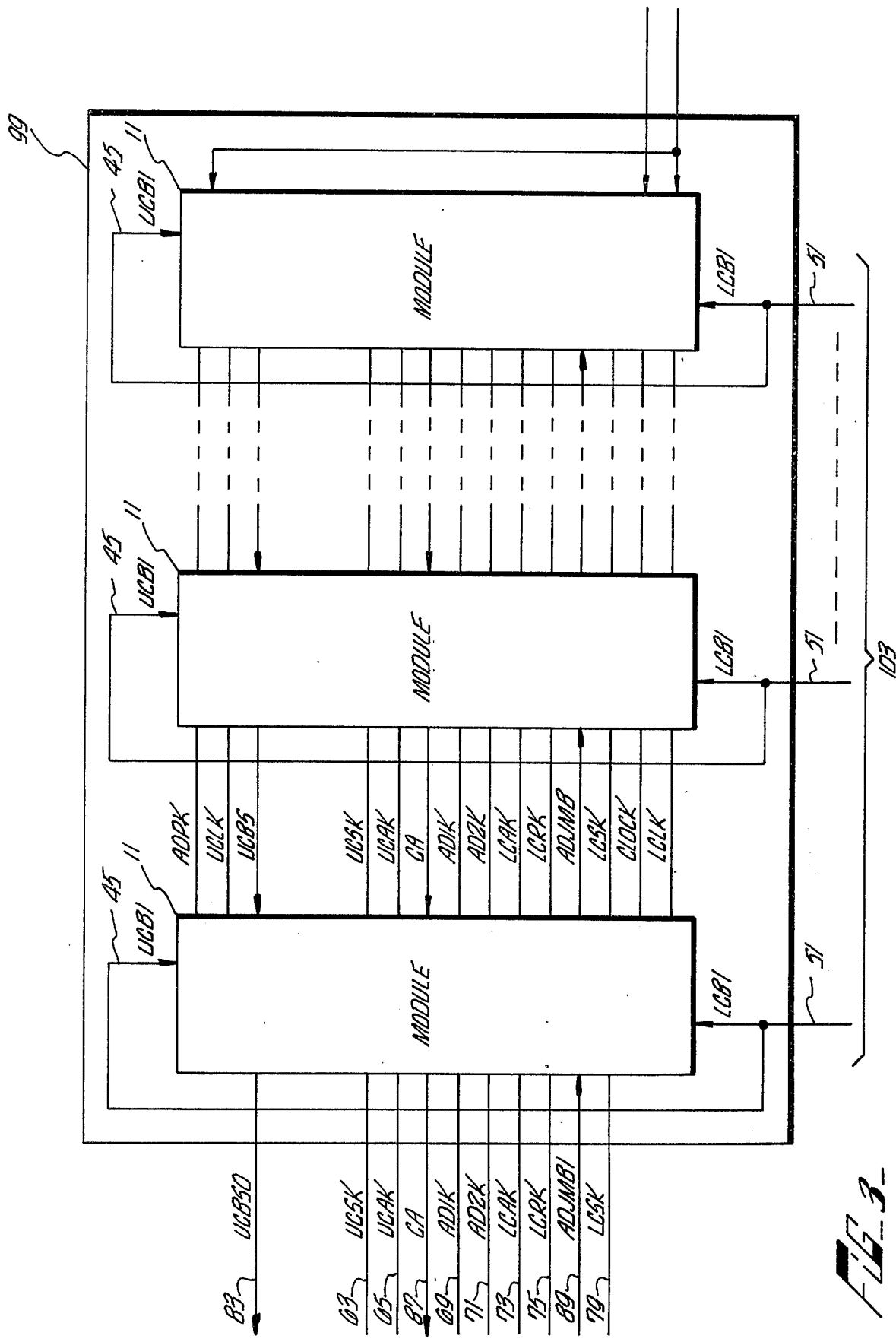
FIG. 3 illustrates in block diagram form the interconnection of a plurality of modules to form a dividend array.

Referring now to FIG. 3, a dividend array 99 is shown as comprising a plurality of like modules 11 connected in series, the number of modules being equal to or greater than the number of bits in the dividend to be processed. The dividend array receives clock signals over clock line 101 and dividend array load control signals over line 81. The dividend array load control signal is supplied to the UCLK and LCLK lines of each module. Since the LCBI lines 51 of each module are connected to the UCBI lines 45 of each module, the dividend is loaded into the upper and lower cell registers of the dividend array at the same time when commanded by the dividend array load control signal. As is the case with the divisor array, the dividend array 99 receives a plurality of control signals from the control unit. The dividend array receives an upper cell shift control signal over line 63, an upper cell add control signal over line 65, and add one control signal over line 69, and add two control signal over line 71, a lower cell add control signal over line 73, a lower cell restore control signal over line 75 and a lower cell shift control signal over line 79. The Q output of the upper flip-flop in the most significant module of the dividend array is supplied over UCBSO line 83 to the quotient array. The full adder in the most significant module supplies its carry output over CA line 87 to the quotient array. The lower flip-flop of the least significant module in the quotient array supplies its Q output over ADJMBI line 89 to the A₂ input of the full adder in the most significant module of the dividend array.

Figure 4:
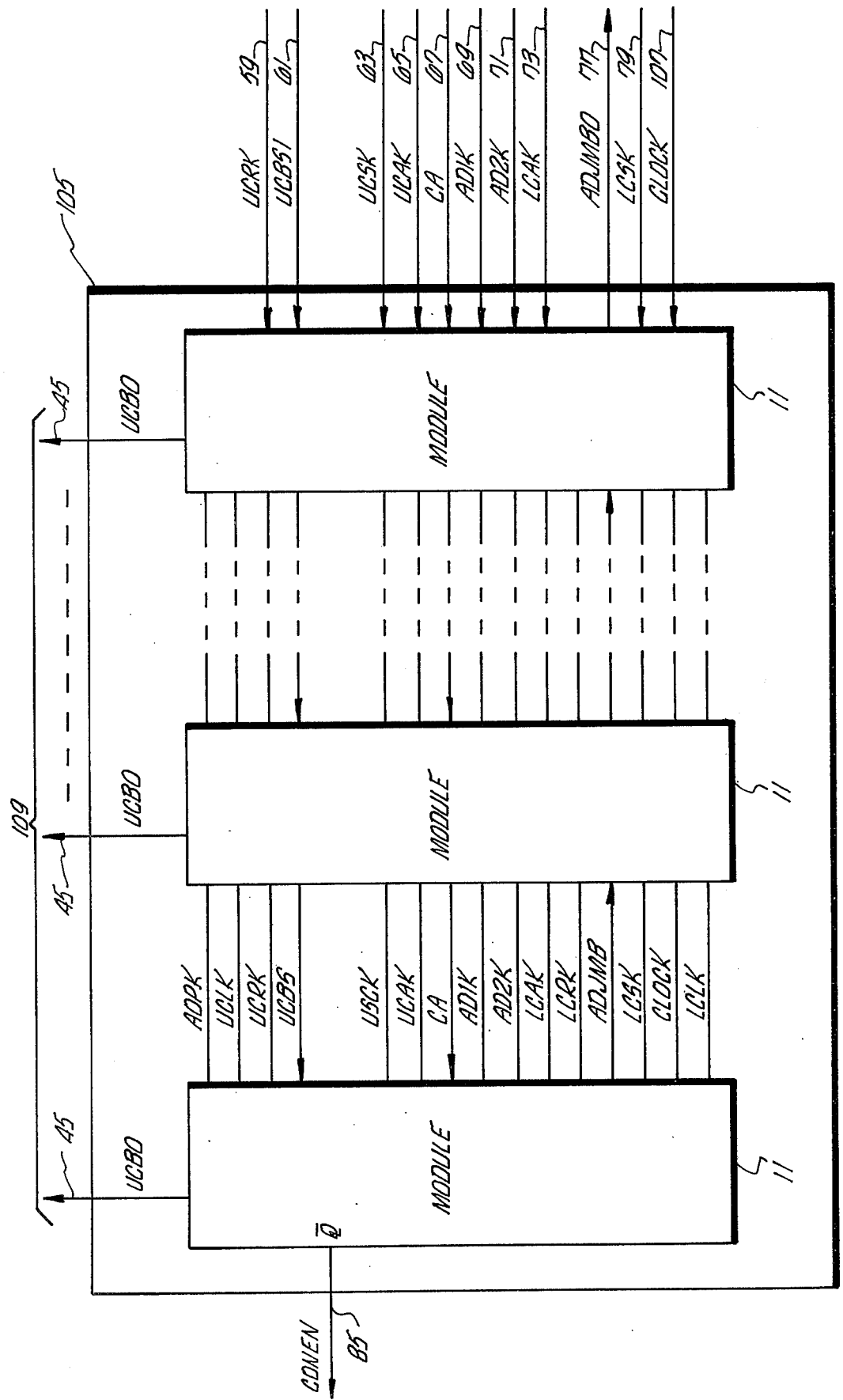
FIG. 4 illustrates in block diagram form the interconnection of a plurality of modules to form a quotient array.

Referring now to FIG. 4, the quotient array 105 is shown as comprising a plurality of like modules 11 connected in series, the number of modules being equal to or greater than the bit accuracy desired in the quotient. The quotient is retrieved over lines 109. The $\overline{Q}$ output of the upper flip-flop in the most significant module of the quotient array is supplied over a Control Enable (CONEN) line 85 to the control unit, to be described hereinafter. The quotient array receives clock signals over clock line 107. The quotient array receives an upper cell restore control signal over line 59, an upper cell shift control signal over line 63, an upper cell add control signal over line 65, an add one control signal over line 69, an add two control signal over line 71, a lower cell add control signal over line 73 and a lower cell shift control signal over line 79. These control signals are supplied to the quotient array from the control unit that will be described hereinafter. In addition to control signals, data is supplied to the quotient array 105 over UCBSI line 61 from the most significant module in the dividend array. The carry output from the most significant module in the dividend array is supplied to the quotient array over carry line 67. The output of the lower flip-flop of the least significant module of the quotient array is supplied over ADJMBO line 77 to the full adder of the most significant module in the dividend array.

Figure 5:
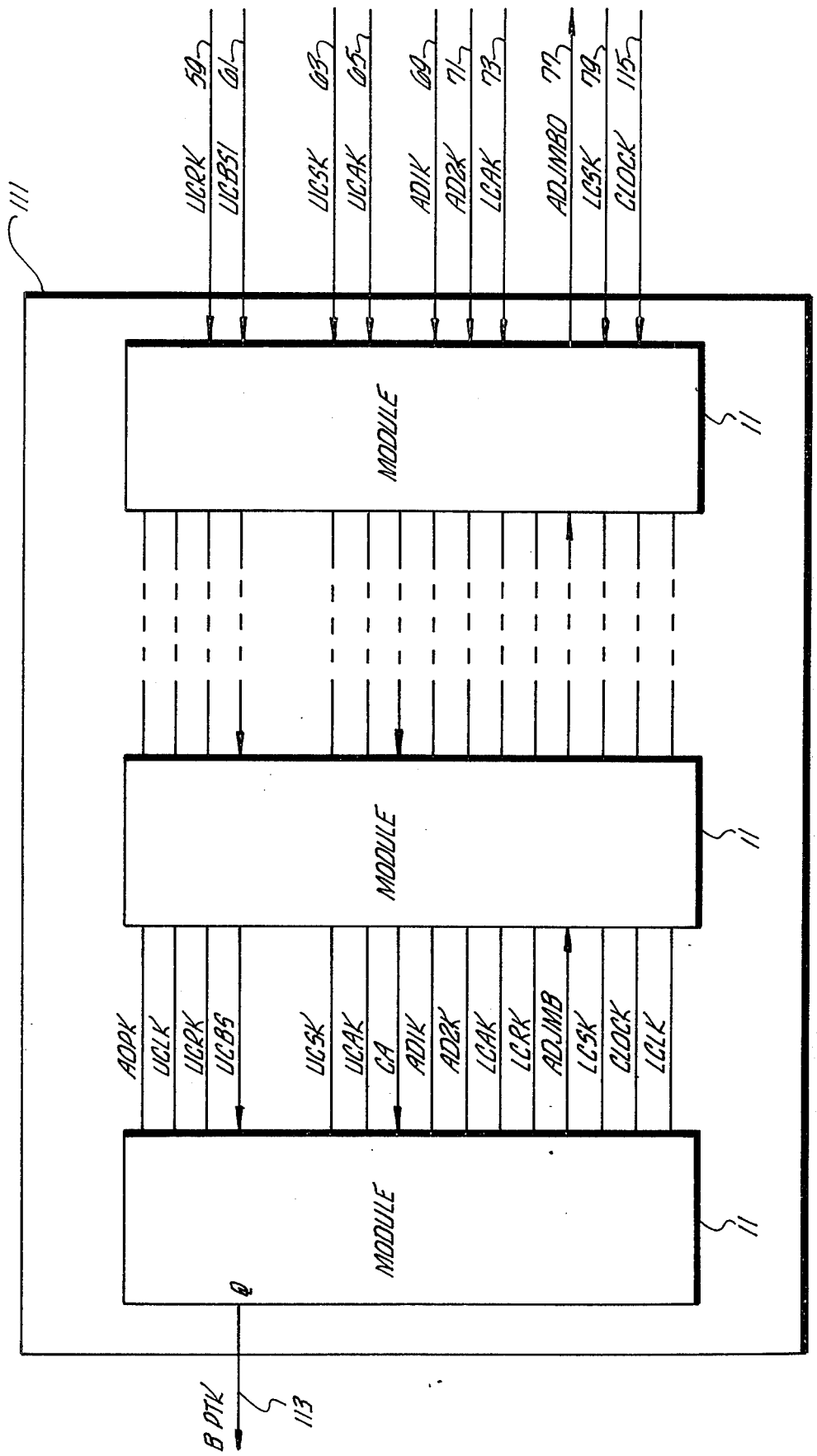
FIG. 5 illustrates in block diagram form the interconnection of a plurality of modules to form a unity array.

Referring now to FIG. 5, a unity array 111 is shown as comprising a plurality of modules connected together in series, the number of modules being equal to the number of modules in the quotient array. Although the number of modules in each of the arrays may be any number desired, it is preferred that the number of modules in each of the arrays, that is in the divisor, dividend, quotient and unity array, be equal. The Q output of the upper flip-flop in the most significant module of the unity array 111 is supplied over a Binary Point Control (BPTK) line 113 to circuitry (not shown herein) for adjusting the binary point or exponent of the quotient in response to the signals on this line. The unity array 111 receives a plurality of control signals from the control unit to be described hereinafter. The unity array receives an upper cell restore control signal on line 59, an upper cell shift control signal on line 63, an upper cell add control signal on line 65, an add one control signal on line 69, an add two control signal on line 71, a lower cell add control signal on line 73, a lower cell shift control signal on line 79 and a clock signal on line 115. The unity array receives the Q output of the upper flip-flop in the most significant module of the divisor array over UCBSI line 61 and it supplies the adjacent module bit out over ADJMBO line 77 to the divisor array.

Figure 6:
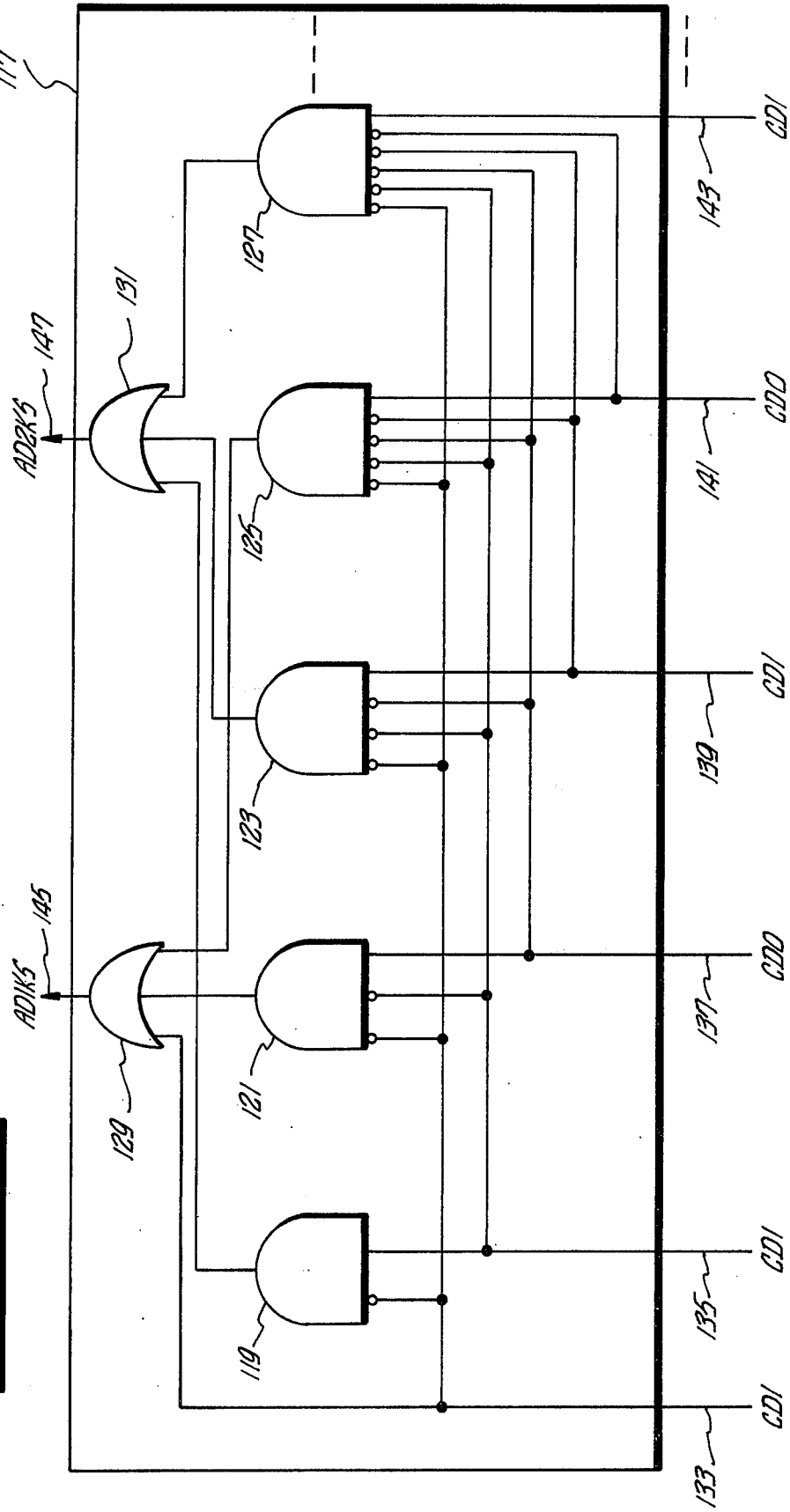
FIG. 6 is a logic diagram of a basic circuit that is redundantly utilized to form the carry detection circuit of this invention.

Referring now to FIG. 6, a logic circuit 117 that is utilized as a building block in the carry detector circuit of the present invention is shown as comprising a plurality of AND and OR Gates. The purpose of this carry detector circuit is to generate an AD1K control signal and an AD2K control signal. For purposes of example, the carry detector circuit 117 is shown to receive the CD0 and CD1 outputs of three modules although, obviously, the logic circuit of the carry detector may be extended to accommodate many more such input pairs. Since the logic of the carry detector 117 is mere combinatorial logic, the carry detector may easily be manufactured as a single chip by the utilization of present integrated circuit technology.

The carry detector generates an add one control signal (AD1KS) on line 145 whenever no module in the divisor array has the same logic level stored in both its upper and lower storage elements, or there is at least one module in the divisor array that has a binary zero stored both in its upper and lower storage elements, in other words, the Q output of both the upper and lower flip-flops is zero, while the $\overline{Q}$ output of the respective flip-flops are one and no more significant module has a binary one stored both in its upper and lower storage element. Conversely, if such is not the case, in other words, if the most significant module storing like values in both storage elements, at the chosen instant in time, is storing a zero in both its upper and lower storage elements, then the carry detector will generate an add two control signal (AD2KS) on line 147.

For purposes of illustrating the function of the carry detector logic 117, let us assume that the module of the divisor array connected to the CD0 and CD1 lines 133 and 135 respectively has, at the particular instant in time chosen, a binary zero stored in its upper and lower storage elements. This will produce a high signal level on line 133 and a low signal level on line 135. The high signal level on line 133 is supplied as an input to OR Gate 129 and will pass through OR Gate 129 to line 145 as an AD1KS signal. The high level on line 133 is also supplied to each of the AND Gates 119, 121, 123, 125 and 127, where it is negated at the respective inputs and prevents these AND Gates from generating an output. In other words, AND Gate 121 is prevented from generating a high level to be supplied to OR Gate 129 and AND Gate 125 is prevented from generating a high signal level to be supplied to OR Gate 129. To the same end, AND Gates 119, 123 and 127 are prevented from generating any high signal levels to be supplied to OR Gate 131. Therefore, only an add one control signal will be generated on line 145, regardless of the conditions in any of the other modules connected to the carry detector.

Assume now that the module connected to the CD0 and CD1 lines 137 and 139 respectively has a binary one stored in its upper and lower storage elements. In other words, the Q output of these two upper and lower flip-flops is one. Consequently, the CD1 output on line 139 will be a high signal level and the CD0 output on line 137 will be a low signal level. This high output level is supplied as a binary one input to AND Gate 123 and as a binary zero input to AND Gates 125 and 127. Assuming that the next most significant module, which would be connected to lines 133 and 135 does not have a similar condition, but rather, has either unlike logic levels in both storage elements or two binary zeroes, the remaining inputs to AND Gate 123 would also be one since they are zero negated, thereby supplying a binary one high signal level to OR Gate 131. This high will be passed through OR Gate 131 as an add two control signal on line 147. If the next most significant module had a binary one stored in both its upper and lower flip-flop, line 135 would be high. Line 133 would be low. This condition would cause AND Gate 119 to produce a high signal level for OR Gate 131. AND Gate 123 would not produce an output. OR Gate 131, in turn, would respond by generating an add two control signal (AD2KS) on line 147.

Figure 7:
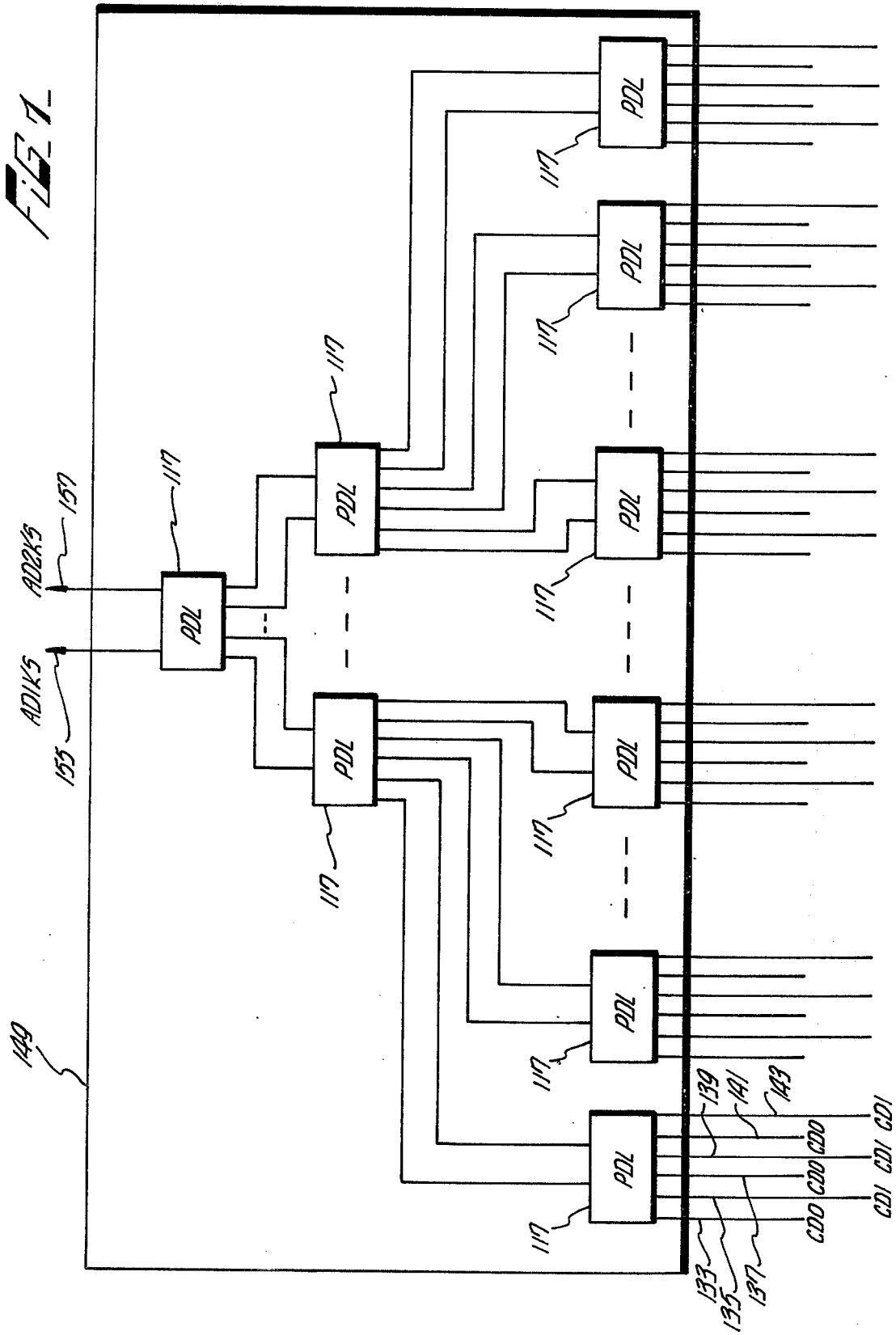
FIG. 7 is a block diagram of the interconnection of a plurality of logic circuits as shown in FIG. 5 to provide a carry detector for this invention.

Referring now to FIG. 7, an N-bit long carry detector 149 is illustrated as being made up of a plurality of carry detector logic circuits as illustrated in FIG. 6. The two output lines from the carry detector logic circuits 117 at a first level are supplied as inputs to the second level of carry detectors. The outputs from the second level of carry detectors 117 are supplied to a third level of carry detectors. This third level, in our example, is a single carry detector logic circuit 117. The outputs from this logic circuit are the add one control signal and the add two control signal on lines 155 and 157, respectively. Only the add two control signal (AD2KS) on line 157 is supplied to the control circuit of this invention.

Figure 8:
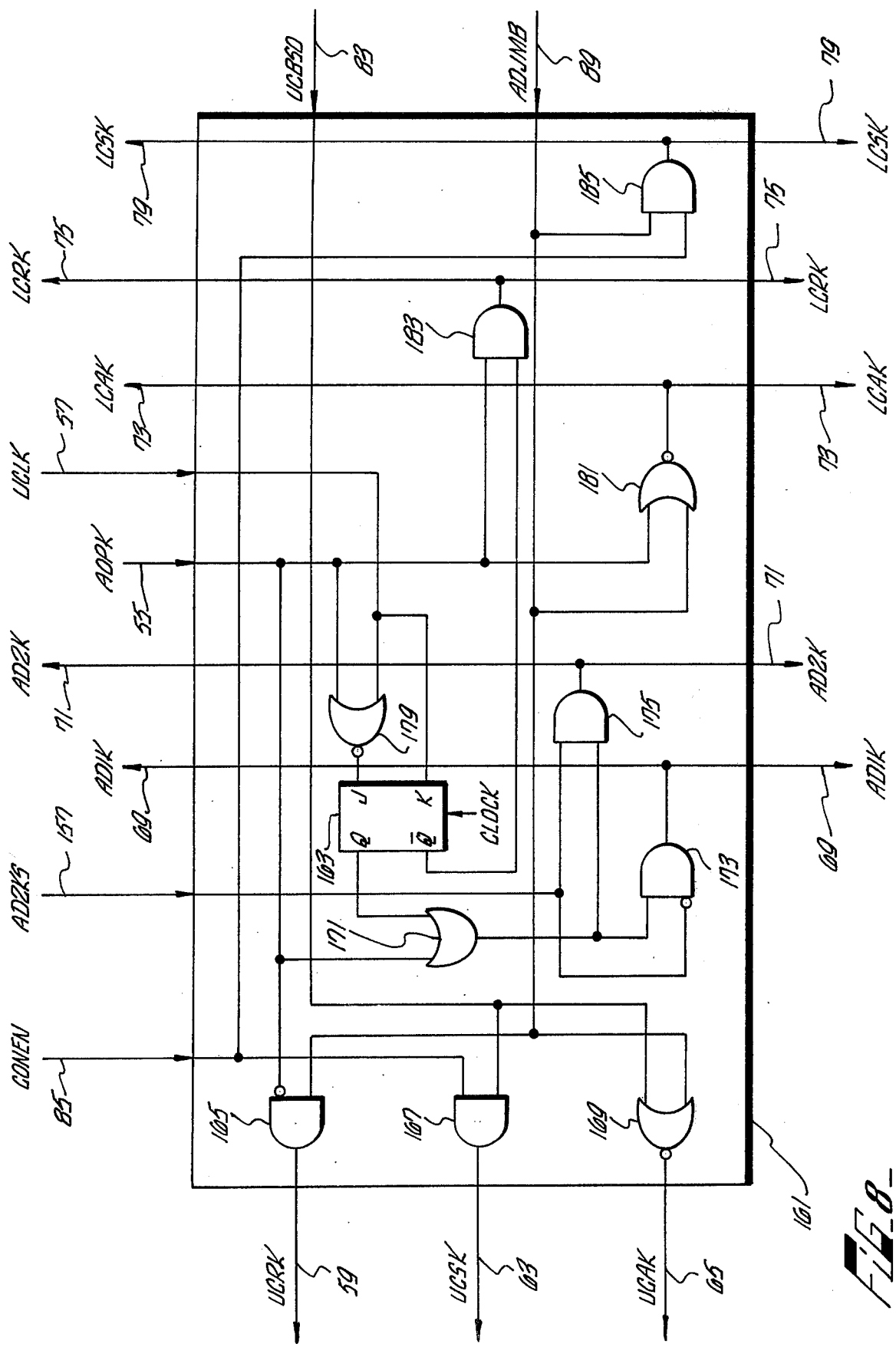
FIG. 8 is a logic circuit diagram of the control circuit for the divider mechanism of this invention.

The control circuit of FIG. 8 functions to generate the control signals necessary to command the various arrays of the divisor mechanism in response to the monitored conditions in these arrays. The control logic comprises a single J-K flip-flop 163 and a plurality of AND and NOR Gates. AND Gate 165 generates an upper cell restore control signal on UCRK line 59. This upper cell restore control signal occurs whenever there is a low signal level on AOPK line 55 and a high signal level on ADJMB line 89. AND Gate 167 generates an upper cell shift control signal on line 63 whenever there is a high signal level on the CONEN line 85 from the quotient array and a high signal level on the UCBSO line 83. NOR Gate 169 generates an upper cell add control signal on line 65. This signal is generated when there is a low signal level on UCBSO line 83 and ADJMB line 89. AND Gate 185 generates a lower cell shift control signal on line 79. This signal is generated whenever there is a high signal level on ADJMB line 89 and a high signal level on CONEN line 85. AND Gate 183 generates a lower cell restore control signal on line 75. This signal is generated whenever there is a high signal level on the AOPK Line 55 and the $\overline{Q}$ output of J-K flip-flop 163 is high. A NOR Gate 181 generates a lower cell add control signal on line 73. This signal is generated whenever the AOPK line 55 is low at the same time that the signal level on the ADJMB line 89 is low.

AND Gate 175 generates an add two control signal on line 71. The add two control signal is generated whenever an add two control signal is received from the carry detector on line 157 and the output of OR Gate 171 is a high. AND Gate 173 generates an add one control signal on line 69. This occurs whenever an add two control signal is not generated by the carry detector and the output of OR Gate 171 is high.

The J-K flip-flop and its associated OR Gate 171 and NOR Gate 179 are utilized to disable AND Gates 173 and 175 at the required times during the operation of the divisor mechanism of this invention. At the occurrence of an upper cell load control signal on line 57, the J-K flip-flop 163 is reset so that its Q output is zero and its $\overline{Q}$ output is one. With the $\overline{Q}$ output of J-K flip-flop at a binary high, AND Gate 183 is enabled. Upon the divisor being loaded into its array, the AOPK line 55 would go high, causing the output of NOR Gate 179 at the next clock to again be zero, thereby not setting the J-K flip-flop 163. As the accelerated operation control signal on line 55 goes high, OR Gate 171 will pass this high, thereby enabling both AND Gates 173 and 175. When, however, the AOPK line 55 goes low, the output of NOR Gate 179 will go high and, at the same time, the output of OR Gate 171 will be inhibited, thereby inhibiting AND Gates 175 and 173. Still in the same clock time, AND Gate 165 will generate its upper cell restore control signal on line 59 and NOR Gate 181 will generate a lower cell add control signal on line 73. At the next clock time, the J-K flip-flop 163 is set by the high output of NOR Gate 179, so that the Q output is high and the $\overline{Q}$ output is low, thereby disabling AND Gate 183 from generating any further lower cell restore control signals on line 75.

The specific interrelationship and sequence of occurrence of these various input control and output control signals from the control circuit of FIG. 8 will be illustrated more clearly in connection with a specific division example, according to this invention, illustrated in FIG. 10.

Referring now to FIG. 9, a divider mechanism according to this invention is shown as comprising four arrays: a divisor array 91, a dividend array 99, a quotient array 105 and a unity array 111. Along with these four arrays, the divider mechanism of the present invention utilizes a carry detector circuit 149 and a control logic circuit 161. Start control circuitry 187 and a clock source 189 initiated by the start control circuitry over line 195 are seen as well within the purview of a person of ordinary skill in the art and will not be further discussed herein.

The divisor array 91 receives a divisor in floating binary point format over lines 201, upon having its divisor array load control 81 raised to a high. It receives clock signals over clock line 93. During the operation of the divisor array, it supplies carry detect zero and carry detect one signals from each module in the array to the carry detector circuit 149 over lines 43 and 47. The carry detector 149, in turn, generates add one control and add two control signals on lines 155 and 157, respectively. Only the AD2KS signals are supplied to the control logic circuit 161. The control circuit 161 generates AD1KS and AD2KS signals in response to the reception or lack of reception of the AD2KS signal. The divisor array 91 generates the Accelerated Operation Control (AOPK) signal on line 55 which is supplied to the control logic 161. This signal is generated as a binary low and occurs whenever the contents of the upper cell register in the divisor array is completely empty, in other words, not a single binary one is stored therein. The upper cell load control signal on line 57, which is derived from the divisor array load control signal on line 81 is supplied to control logic 161. The $\overline{Q}$ output of the upper flip-flop in the most significant module of the divisor array 91 is supplied over the UCBSO line 83 to the upper flip-flop in the least significant module of the unity array 111, as well as to control logic 161. The Q output of the lower flip-flop in the least significant module of the unity array is supplied over the ADJMB line 89 to the divisor array 91 and to the control logic 161. The Q output of the upper flip-flop in the most significant module of the quotient array is supplied over control enable line 85 to control logic 161.

The dividend array 99 receives a clock signal over clock line 101 and a dividend array load control signal over line 81 from start control 187. The dividend is loaded into the dividend array in floating binary point format at input lines 197. The Q output of the upper flip-flop in the most significant module of the dividend array is supplied over UCBSO line 83 to the input of the upper flip-flop in the least significant module of the quotient array. The carry output of the full adder in the most significant module of the dividend array is supplied to the carry input of the full adder in the least significant module of the quotient array over line 87. The quotient array 105 supplies the Q output of the lower flip-flop in its least significant module to the dividend array 99 over the ADJMB line 89.

The quotient array 105 receives a clock signal over clock line 107 and generates a control enable signal on line 85, which comes from the Q output of the upper flip-flop in the most significant module of the quotient array. The quotient is retrieved from the output lines 199 of the quotient array in a floating binary point format.

The unity array 111 receives a clock signal over clock line 115 and generates a BPTK signal on line 203 that may or may not cause the binary point of the quotient to move to the right one position.

The control logic circuit 161 receives the various control signals enumerated above and generates, in response thereto, control signals for the divisor, dividend, quotient and unity array. The control logic generates an upper cell restore control signal on line 59, which is supplied to both the unity and quotient array. The control logic generates an upper cell shift control signal on line 63, which is supplied to all four arrays. The control logic generates an upper cell add control signal on line 65, which is supplied to all four arrays. An AD1K and AD2K signal on lines 69 and 71 respectively are supplied to all four arrays. A lower cell add control signal on line 73 is supplied to all four arrays. A lower cell restore control signal on line 75 is supplied to both the divisor and the dividend arrays. A lower cell shift control signal on line 79 is supplied to all four arrays.

The operation of the divider mechanism of FIG. 9 will now be explained in connection with a specific division example. The divisor will be 9 or, in binary form 1001, the dividend will be 27 or, in binary form 11011. The answer, of course, is 3 or, in binary form 11. FIGS. 10A through 10F represent a state diagram of the signals in the four arrays as well as the control signals being generated during each step of the solution to the division problem. FIG. 11 should be referred to for the relationships of FIGS. 10A through 10F.

The divider mechanism of this invention operates on binary numbers that are expressed in a floating binary point format. That is, the binary point can be thought of as physically located immediately to the left of the most significant module in the divisor array, the quotient array and the dividend array. Exponent registers (not shown) for handling the binary exponents during a division process are well known to those of ordinary skill in the art and will not be discussed herein. As can be seen from the state diagram of FIG. 10, the quotient array has been chosen to be twice the length of the dividend array and the divisor array, thereby providing a double precision option.

The first step of the process is the loading of the divisor and dividend in their respective arrays in the upper cell and lower cell registers of those arrays are shown at step 1. The second step calls for the shifting to the left by one bit position the contents of the upper cell registers of both the divisor and dividend arrays while restoring the contents of the lower cell registers of these arrays. This loads a binary one into the least significant position of the quotient array. The third step calls for a vertical add, in which the contents of the upper and lower registers are summed together, the result being placed in the upper cell registers of both the divisor and dividend array respectively. The fourth step again calls for a left shift. The fifth step again calls for a vertical add. Meanwhile, the quotient array is seeing the development of the quotient most significant bit first. At the fifth step the quotient is developed to a bit precision of three. The sixth, seventh, eighth and ninth stops are all left shift steps. To speed up the process apparatus that is well known in the art may be utilized to accomplish these four shifts in one clock time. By the use of such apparatus, the sixth step then would produce a quotient that is accurate to the first six most significant bits. The occurrence of all binary ones in the upper cell register of the unity array and all binary zeros in the upper cell register of the divisor array at this point indicates that the first period of the reciprocal of the divisor has been generated. This first period, as was discussed in the theoretical background, is six bits long.

The control circuit of FIG. 8 detects this condition and generates an upper cell add control signal and a lower cell add control signal, thereby emptying the upper and lower cell registers and entering the contents of the upper cell registers of the unity array into the contents of the lower cell register of the unity array, entering the contents of the upper cell register in the quotient array into the lower cell register of the quotient array and entering the contents of the upper cell register in the dividend array into the lower cell register of the dividend array. This occurs at step 7. The next six steps, which we may call eleven, twelve, thirteen, fourteen, fifteen and sixteen, are all shift steps wherein the contents of the lower cell registers of all the arrays are shifted to the right. Again, by the use of apparatus well known in the art to perform multiple shifts in a single clock time, the six shift steps can be performed in one clock time, thus the sixteenth step is actually only the eighth step.

In response to the state or contents of the registers in the divisor and unity arrays, the control logic at the ninth step generates an upper cell add control signal, a lower cell add control signal and an add one control signal, thereby causing the contents of the upper and lower cell register in the unity array to be identical, the upper and lower cell registers of the divisor array to have identical contents, the upper and lower cell registers of the quotient array to have identical contents and the upper and lower cell registers of the dividend array to have identical contents. The next six steps, which we may call eighteen, nineteen, twenty, twenty-one, twenty-two and twenty-three, are shift steps whereby the contents of the upper cell registers in all the arrays are shifted to the left at the same time that the contents of the lower cell registers of all the arrays are shifted to the right. Again, utilizing apparatus well known in the art to implement a plurality of shifts in one clock time, in actuality we can accomplish these shifts in one step which we will call step ten.

At this point, if the double precision option has not been selected, the quotient has been generated to a twelve bit accuracy at step ten (twenty-one) and, as a result thereof, the control enable signal on line 85 (FIG. 9) will turn off the control logic. Since the output of the unity array at step ten, in other words binary point control signal on line 203 is a binary zero, at the time the control logic is turned off by the control enable signal on line 85, the binary point mechanism (not shown) will be instructed to move the binary point in the quotient one bit position to the right, in addition to the movement caused by the twos exponent values.

Assuming now that a double precision option is selected, the tenth step by the use of multiple shifts per clock time apparatus only produces a quotient that is accurate to twelve bits. In response to the states of the upper and lower cell registers of the unity and divisor arrays, the control logic at the eleventh step will generate an upper cell add control signal, a lower cell add control signal and an add one control signal, causing the contents of the upper and lower cell registers in the unity array to be identical, the contents of the upper and lower cell registers in the divisor array to be identical, the contents of the upper and lower cell registers in the quotient array to be identical and the contents of the upper and lower cell registers in the dividend array to be identical. As a result thereof, the next twelve steps, twenty-five through thirty-six, are again shift steps in which the contents of the upper cell registers in all the arrays are shifted to the left and the contents of the lower cell registers in all the arrays are shifted to the right. Again, utilizing apparatus well known in the art to perform multiple shifts in one clock time, these twelve shifts can be thought of as step twelve, resulting in a quotient having twenty-four bit accuracy at step twelve. At step thirteen, the contents of all arrays are cleared to prepare the divider apparatus for the next division problem.

From the above description it can be seen that the modular divider mechanism provides accelerated generation of a quotient of two binary numbers once the quotient has been attained to a precision equal to the bit length of the first period of the reciprocal of the divisor. It should be understood, of course, the foregoing disclosure relates only to a preferred embodiment of the invention and that numerous modifications may be made therein without departing from the spirit and scope of the invention as set forth in the appended claims.

What is claimed is:

1. A divider for dividing a dividend bit pattern by a divisor bit pattern to form a quotient bit pattern, comprising:
   first means for receiving a divisor bit pattern;
   said first means including means for manipulating a received divisor bit
   pattern so as to produce control signals representative of the multiplication of the received divisor bit pattern by its reciprocal;
   second means for receiving a dividend bit pattern;
   means for applying said control signals produced by said first means to said second means;
   said second means including means responsive to said control signals for manipulating a received dividend bit pattern in accordance with said control signals so as to generate output signals representative of said quotient bit pattern; and
   third means for detecting if said quotient has been generated to a bit precision equal to the bit length of a period of the reciprocal of said divisor, and, in response to such detection, doubling the precision of the generated quotient.

2. A divider for producing the quotient of a binary divisor and a binary dividend comprising:
   a divisor array including upper and lower divisor storage cell arrays and including first logic means for adding together the contents of said upper and lower divisor storage cell arrays, shifting the contents of said upper and lower divisor storage cell arrays and restoring the contents of said lower divisor storage cell array;
   a dividend array including upper and lower dividend storage cell arrays and including second logic means for adding together the contents of said upper and lower dividend storage cell arrays, shifting the contents of said upper and lower dividend storage cell arrays and restoring the contents of said lower dividend storage cell array;

a quotient array including third logic means for developing said quotient in response to said adding and said shifting in said dividend array; and control logic means responsive to the bits in said upper and lower divisor storage cell arrays for controlling the operation of said first, second and third logic means and for detecting if said quotient has been developed to a bit precision equal to the bit length of a period of the reciprocal of said divisor.

3. The divider of claim 2, wherein said control logic means includes a unity array and is responsive to output signals of said unity array and the bits in said upper and lower divisor storage cell arrays for controlling said third logic means to double the precision of said quotient upon detecting that that said quotient has been developed to a bit precision equal to the bit length of a period of the reciprocal of said divisor.

4. The divider of claim 3, wherein said divisor array, dividend array, quotient array and unity array each comprise a plurality of like-structured modules.

5. The divider of claim 4, wherein each said like structured module of said divisor and dividend arrays includes:
- an upper one bit storage element for each cell of each upper cell array;
- a lower one bit storage element for each cell of each lower cell array; and
- a full adder included in each of said first and second logic means having a carry input and a carry output, said adder connected to receive a first add input from said upper storage element and a second add input from said lower storage element, and connected to deliver a sum output to said upper storage element in response to a first control signal from said control logic means and to said lower storage element in response to a second control signal from said control logic means.

* * * * *

UNITED STATES PATENT AND TRADEMARK OFFICE
CERTIFICATE OF CORRECTION

PATENT NO. : 4,011,439
DATED : March 8, 1977
INVENTOR(S) : Walter Scott Bennett

It is certified that error appears in the above-identified patent and that said Letters Patent are hereby corrected as shown below:

Col. 1, line 6, change "489,855" to --489,885--.
　　　　line 15, change "489,884" to --489,886--.

Col. 7, line 27, change "overline" to --over line--.
Col. 11, line 18, between "control" and "81", insert --line--.
Col. 12, line 49, change "are" to --as--.
　　　　line 65, change "stops" to --steps--.
Col. 13, line 13, change "registers" to --register--.

Col. 14, line 36, should be indented.

Signed and Sealed this

Fourteenth Day of June 1977

[SEAL]

*Attest:*

RUTH C. MASON
*Attesting Officer*

C. MARSHALL DANN
*Commissioner of Patents and Trademarks*